United States Patent
Waldo et al.

(10) Patent No.: US 6,185,611 B1
(45) Date of Patent: Feb. 6, 2001

(54) DYNAMIC LOOKUP SERVICE IN A DISTRIBUTED SYSTEM

(75) Inventors: James H. Waldo, Dracut; Ann M. Wollrath, Groton; Robert W. Scheifler, Somerville; Kenneth C. R. C. Arnold, Lexington, all of MA (US)

(73) Assignee: Sun Microsystem, Inc., Palo Alto, CA (US)

( * ) Notice: Under 35 U.S.C. 154(b), the term of this patent shall be extended for 0 days.

(21) Appl. No.: 09/044,931

(22) Filed: Mar. 20, 1998

(51) Int. Cl.[7] .................................................. G06F 15/177

(52) U.S. Cl. .................. 709/221; 709/201; 709/223; 709/224

(58) Field of Search .................................... 709/220, 221, 709/222, 223, 224, 201

(56) References Cited

PUBLICATIONS

Birrell et al., *Implementing Remote Procedure Calls*, ACM Transactions on Computer Systems, vol. 2, No. 1, Feb. 1984, pp. 39–59.

*Primary Examiner*—Mehmet B. Geckil
(74) *Attorney, Agent, or Firm*—Finnegan, Henderson, Farabow, Garrett & Dunner, L.L.P.

(57) ABSTRACT

An improved lookup service is provided that allows for the dynamic addition and deletion of services. This lookup service allows for the addition and deletion of services automatically, without user intervention. As a result, clients of the lookup service may continue using the lookup service and its associated services while the updates occur. Additionally, the lookup service provides a notification mechanism that can be used by clients to receive a notification when the lookup service is updated. By receiving such a notification, clients can avoid attempting to access a service that is no longer available and can make use of new services as soon as they are added to the lookup service.

7 Claims, 8 Drawing Sheets ated Computing System," filed on Feb. 26, 1998.

U.S. patent application Ser. No. 09/044,923, entitled "Method and System for Leasing Storage."

U.S. patent application Ser. No. 09/044,838, entitled "Method, Apparatus, and Product for Leasing of Delegation Certificates in a Distributed System."

U.S. patent application Ser. No. 09/044,834, entitled "Method, Apparatus and Product for Leasing of Group Membership in a Distributed System."

U.S. patent application Ser. No. 09/044,916, entitled "Leasing for Failure Detection," bearing attorney docket no. 06502.0011-04000, and filed on the same date herewith.

U.S. patent application Ser. No. 09/044,933, entitled "Method for Transporting Behavior in Event Based System."

U.S. patent application Ser. No. 09/044,919, entitled "Deferred Reconstruction of Objects and Remote Loading for Event Notification in a Distributed System."

U.S. patent application Ser. No. 09/044,938, entitled "Methods and Apparatus for Remote Method Invocation."

U.S. patent application Ser. No. 09/045,652, entitled "Method and System for Deterministiic Hashes to Identify Remote Methods."

U.S. patent application Ser. No. 09/044,790, entitled "Method and Apparatus for Determining Status of Remote Objects in a Distributed System."

U.S. patent application Ser. No. 09/044,930, entitled "Downloadable Smart Proxies for Performing Processing Associated with a Remote Procedure Call in a Distributed System."

U.S. patent application Ser. No. 09/044,917, entitled "Suspension and Continuation of Remote Methods."

U.S. patent application Ser. No. 09/044,835, entitled "Method and System for Multi-Entry and Multi-Template Matching in a Database."

U.S. patent application Ser. No. 09/044,839, entitled "Method and System for In-Place Modifications in a Database."

U.S. patent application Ser. No. 09/044,945, entitled "Method and System for Typesafe Attribute Matching in a Database."

U.S. patent application Ser. No. 09/044,939, entitled "Apparatus and Method for Providing Downloadable Code for Use in Communicating with a Device in a Distributed System."

U.S. patent application Ser. No. 09/044,826, entitled "Method and System for Facilitating Access to a Lookup Service."

U.S. patent application Ser. No. 09/044,932, entitled "Apparatus and Method for Dynamically Verifying Information in a Distributed System."

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces."

U.S. patent application Ser. No. 09/044,934, entitled "Polymorphic Token-Based Control."

U.S. patent application Ser. No. 09/044,915, entitled "Stack-Based Access Control."

U.S. patent application Ser. No. 09/044,944, entitled "Stack-Based Security Requirements."

U.S. patent application Ser. No. 09/044,837, entitled "Per-Method Designation of Security Requirements."

FIELD OF THE INVENTION

The present invention relates generally to data processing systems and, more particularly, to a dynamic lookup service in a distributed system.

BACKGROUND OF THE INVENTION

A lookup service contains an indication of where network services are located within a distributed system comprised of multiple machines, such as computers and related peripheral devices, connected in a network (for example, a local area network, wide area network, or the Internet). A "network service" refers to a resource, data, or functionality that is accessible on the network. Typically, for each service, the lookup service contains an address used by a client (e.g., a program) to access the service (e.g., a printer).

Conventional lookup services are static: whenever updates to the lookup service are needed to either add a new service or delete an existing service, the lookup service is taken offline, rendering the lookup service inaccessible, and then, the lookup service is manually updated by the system administrator. During the time when the lookup service is offline, clients in the distributed system are unable to access the lookup service and any of its network services.

Another limitation of conventional lookup services is that, when updated, clients are not made aware of the updates to the lookup service until they explicitly perform a refresh operation, which downloads the latest service information to the clients. Before such a refresh, however, if a client requests a service that is no longer available, an error occurs which may cause the client to hang. Also, before a refresh, the client is not aware of any new services that have been recently added to the lookup service. It is therefore desirable to improve lookup services for distributed systems.

SUMMARY OF THE INVENTION

Systems consistent with the present invention provide an improved lookup service that allows for the dynamic addition and deletion of services. This lookup service allows for the update, i.e., addition and deletion of available services automatically, without user intervention. As a result, clients of the lookup service may continue using the lookup service and its associated services while the updates occur. Additionally, the lookup service provides a notification mechanism that can be used by clients to receive a notification when the lookup service is updated. By receiving such a notification, clients can avoid attempting to access a service that is no longer available and can make use of new services as soon as they are added to the lookup service.

In accordance with methods consistent with the present invention, a method is provided in a data processing system having a lookup service with associated services. This method receives a request by the lookup service for notification when the lookup service is updated, determines when the lookup service is updated, and generates a notification when it is determined that the lookup service is updated.

In accordance with methods consistent with the present invention, a method is provided in a data processing system having a lookup service with associated services. This method sends a request to the lookup service to be notified when the lookup service is updated and receives an indication that the lookup service has been updated.

In accordance with systems consistent with the present invention, a data processing system comprising a memory and a processor is provided. The memory includes a lookup service containing indications of services that are available for use, a first client for updating the lookup service, and a second client for utilizing the lookup service while the first client is updating the lookup service. The processor runs the lookup service, the first client, and the second client.

In accordance with systems consistent with the present invention, a data processing system containing a memory and a processor is provided. The memory contains a lookup service with indications of services available for use and a client. The lookup service receives requests for notification of when the lookup service is updated, determines when the lookup service is updated, and generates notifications when the lookup service is updated. The client sends a request to the lookup service to be notified when the lookup service is updated. The processor runs the client and the lookup service.

In accordance with systems consistent with the present invention, a computer-readable memory device containing a data structure is provided. This data structure is for accessing a lookup service with associated network services available for use. The data structure contains a notify method for use by a client to register with the lookup service to receive a notification from the lookup service when the lookup service is updated.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
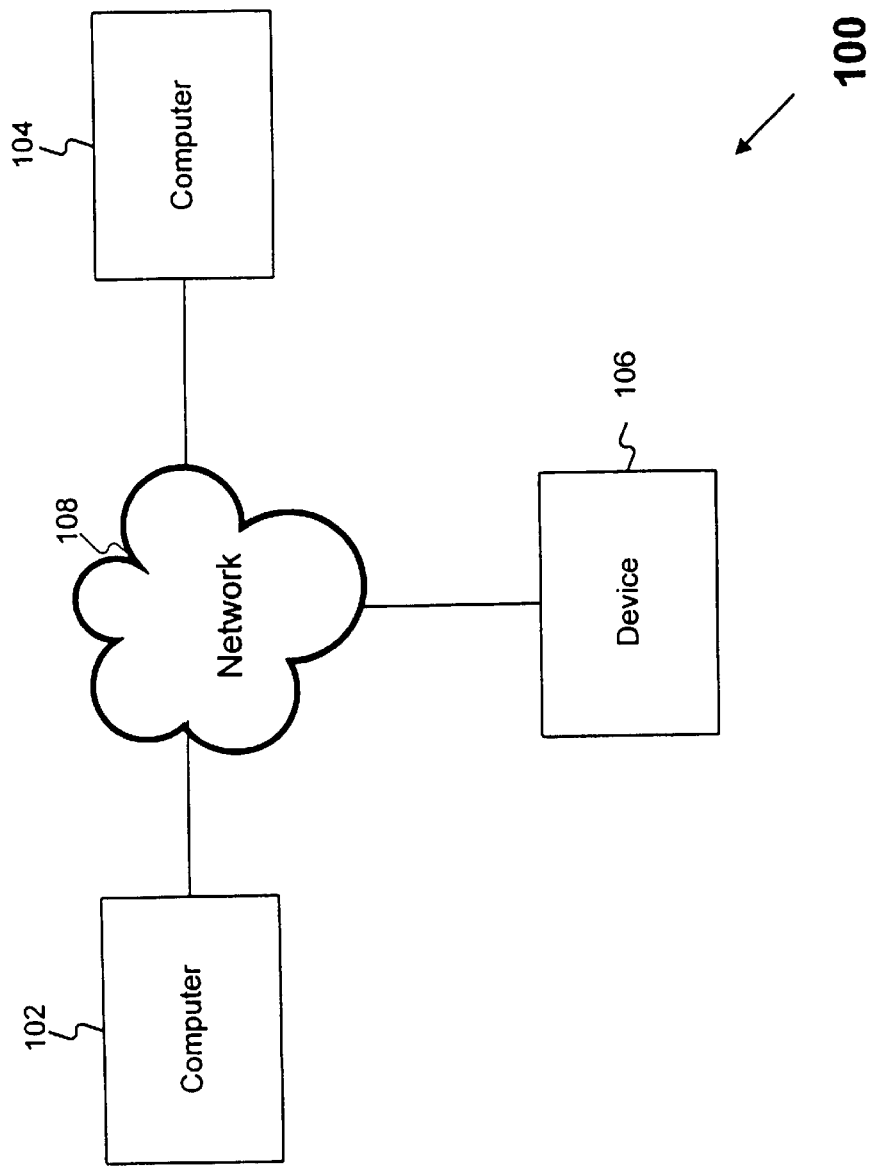
FIG. 1 depicts a distributed system suitable for practicing methods and systems consistent with the present invention.

Methods and systems consistent with the present invention provide an improved lookup service that allows for the dynamic addition and deletion of services. As such, the addition and deletion of services is performed automatically, without user intervention, and clients of the lookup service may continue using the services while the updates to the lookup service occur. Additionally, clients may register with the lookup service to receive notification of when the lookup service is updated. As a result, when an update occurs, all registered clients receive a notification of the update, enabling the clients to avoid attempting to access a service that is no longer available and to use a service recently added to the lookup service.

Overview of the Distributed System

Methods and systems consistent with the present invention operate in a distributed system ("the exemplary distributed system") with various components, including both hardware and software. The exemplary distributed system (1) allows users of the system to share services and resources over a network of many devices; (2) provides programmers with tools and programming patterns that allow development of robust, secured distributed systems; and (3) simplifies the task of administering the distributed system. To accomplish these goals, the exemplary distributed system utilizes the Java™ programming environment to allow both code and data to be moved from device to device in a seamless manner. Accordingly, the exemplary distributed system is layered on top of the Java programming environment and exploits the characteristics of this environment, including the security offered by it and the strong typing provided by it. The Java programming environment is more clearly described in Jaworski, *Java 1.1 Developer's Guide,* Sams.net (1997), which is incorporated herein by reference.

In the exemplary distributed system, different computers and devices are federated into what appears to the user to be a single system. By appearing as a single system, the exemplary distributed system without giving up the flexibility and personalized response of a personal computer or workstation. The exemplary distributed system may contain thousands of devices operated by users who are geographically disperse, but who agree on basic notions of trust, administration, and policy.

Within the exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as applications or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

FIG. 1 depicts the exemplary distributed system 100 containing a computer 102, a computer 104, and a device 106 interconnected by a network 108. The device 106 may be any of a number of devices, such as a printer, fax machine, storage device, input device, computer, or other devices. The network 108 may be a local area network, wide area network, or the Internet. Although only two computers and one device are depicted as comprising the exemplary distributed system 100, one skilled in the art will appreciate that the exemplary distributed system 100 may include additional computers or devices.

Figure 2:
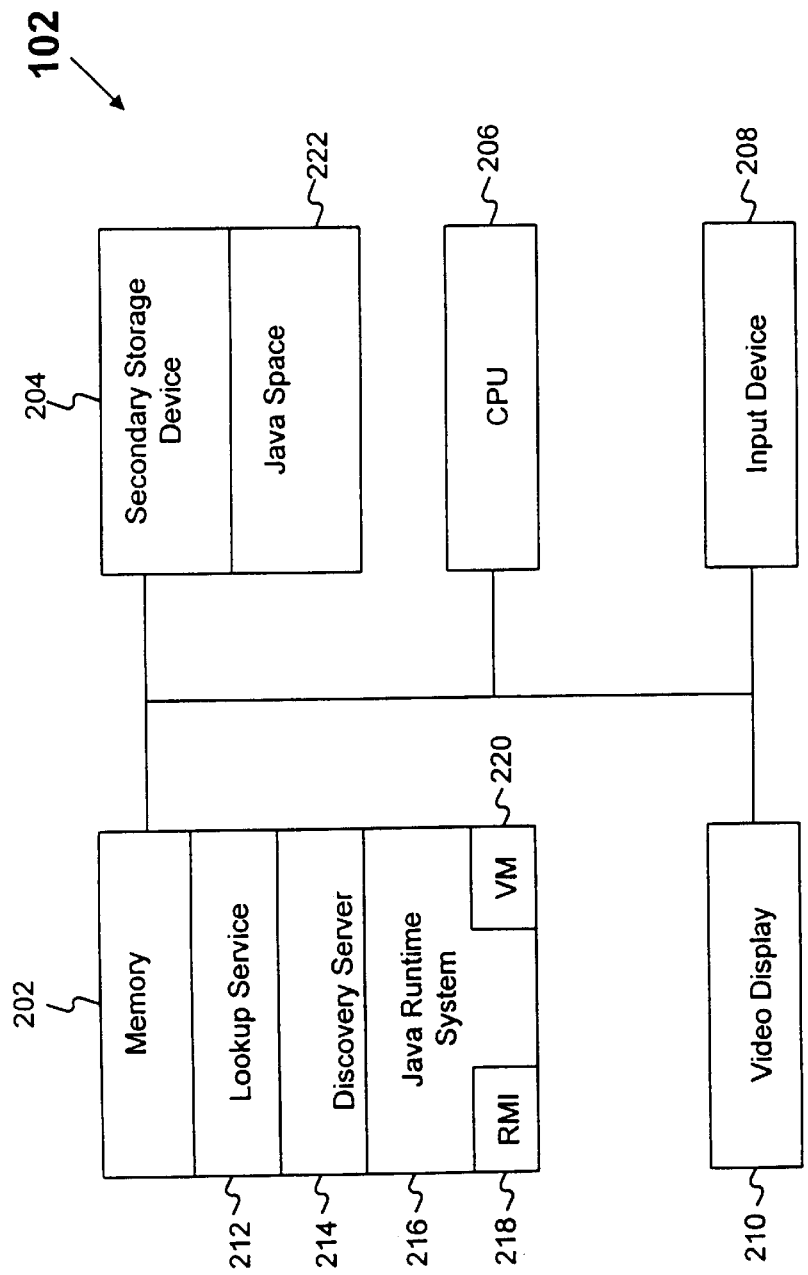
FIG. 2 depicts a more detailed block diagram of a computer depicted in FIG. 1.

FIG. 2 depicts the computer 102 in greater detail to show a number of the software components of the exemplary distributed system 100. One skilled in the art will appreciate that computer 104 or device 106 may be similarly configured. Computer 102 includes a memory 202, a secondary storage device 204, a central processing unit (CPU) 206, an input device 208, and a video display 210. The memory 202 includes a lookup service 212, a discovery server 214, and a Java™ runtime system 216. The Java runtime system 216 includes the Java™ remote method invocation system (RMI) 218 and a Java™ virtual machine 220. The secondary storage device 204 includes a Java™ space 222.

As mentioned above, the exemplary distributed system 100 is based on the Java programming environment and thus makes use of the Java runtime system 216. The Java runtime system 216 includes the Java™ Application Programming Interface (API), allowing programs running on top of the Java runtime system to access, in a platform-independent manner, various system functions, including windowing capabilities and networking capabilities of the host operating system. Since the Java API provides a single common API across all operating systems to which the Java runtime system 216 is ported, the programs running on top of a Java runtime system run in a platform-independent manner, regardless of the operating system or hardware configuration of the host platform. The Java runtime system 216 is provided as part of the Java™ software development kit available from Sun Microsystems of Mountain View, Calif.

The Java virtual machine 220 also facilitates platform independence. The Java virtual machine 220 acts like an abstract computing machine, receiving instructions from programs in the form of byte codes and interpreting these byte codes by dynamically converting them into a form for execution, such as object code, and executing them. RMI 218 facilitates remote method invocation by allowing objects executing on one computer or device to invoke methods of an object on another computer or device. Both RMI and the Java virtual machine are also provided as part of the Java software development kit.

The lookup service 212 defines the services that are available for a particular Djinn. That is, there may be more than one Djinn and, consequently, more than one lookup service within the exemplary distributed system 100. The lookup service 212 contains one object for each service within the Djinn, and each object contains various methods that facilitate access to the corresponding service. The lookup service 212 and its access are described in greater detail in co-pending U.S. patent application Ser. No. 09/044, 826, entitled "Method and System for Facilitating Access to a Lookup Service," which has previously been incorporated by reference.

The discovery server 214 detects when a new device is added to the exemplary distributed system 100, during a process known as boot and join or discovery, and when such a new device is detected, the discovery server passes a reference to the lookup service 212 to the new device, so that the new device may register its services with the lookup service and become a member of the Djinn. After registration, the new device becomes a member of the Djinn, and as a result, it may access all the services contained in the lookup service 212 and its registered services may be accessed by other members of the Djinn. The process of boot and join is described in greater detail in co-pending U.S. patent application Ser. No. 09/044,939, entitled "Apparatus and Method for providing Downloadable Code for Use in Communicating with a Device in a Distributed System," which has previously been incorporated by reference.

The Java space 222 is an object repository used by programs within the exemplary distributed system 100 to store objects. Programs use the Java space 222 to store objects persistently as well as to make them accessible to other devices within the exemplary distributed system. Java spaces are described in greater detail in co-pending U.S. patent application Ser. No. 08/971,529, entitled "Database System Employing Polymorphic Entry and Entry Matching," assigned to a common assignee, filed on Nov. 17, 1997, which is incorporated herein by reference. One skilled in the art will appreciate that the exemplary distributed system 100 may contain many lookup services, discovery servers, and Java spaces.

Although systems and methods consistent with the present invention are described as operating in the exemplary distributed system and the Java programming environment, one skilled in the art will appreciate that the present invention can be practiced in other systems and other programming environments. Additionally, although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Sun, Sun Microsystems, the Sun Logo, Java, and Java-based trademarks are trademarks or registered trademarks of Sun Microsystems Inc. in the United States and other countries The Lookup Service Definition A lookup service provides a central registry of services available within a Djinn. This lookup service is the primary mechanism for programs to find services within the Djinn and is the foundation for providing user interfaces through which users and administrators can discover and interact with services of the Djinn.

The lookup service maintains a flat collection of service items. The collection is flat in that the service items do not form a hierarchy. Each service item represents an instance of a service available within the Djinn. The service item contains a stub (if the service is implemented as a remote object) or a serialized object (if the service is a local object stored in the lookup service) that programs use to access the service, and an extensible collection of attributes that describe the service or provide secondary interfaces to the service. A "stub" is code and data that facilitates access to a remote function, and a "serialized object" is an object placed in a serialized form.

Although the collection of service items is flat, a wide variety of hierarchical views can be imposed on the collection by aggregating items according to service types and attributes. The lookup service provides a set of methods to enable users and administrators to browse the collection and build a variety of user interfaces. Once an appropriate service is found, the user can interact with the service by loading a user interface applet, attached as another attribute on the item.

When a new service is created (e.g., when a new device is added to a Djinn), the service registers itself with the lookup service, providing an initial collection of attributes. For example, a printer may include attributes indicating speed (in pages per minute), resolution (in dots per inch), and whether duplex printing is supported. The attributes also contain an indicator that the service is new and needs to be configured. To configure a new service, the administrator locates an attribute that provides an applet for this purpose, and during configuration, the administrator may add new attributes, such as the physical location of the service and a common name for it.

The lookup service provides an event mechanism that generates notifications as new services are registered, existing services are deleted, or attributes of a service are modified. To use the event mechanism, a client registers to be notified upon the occurrence of a particular event, and when the event occurs, the lookup service notifies the client. The lookup service itself also uses the event mechanism to receive notifications when attributes are added, so that it can re-register with them in the future.

Programs (including other services) that need a particular type of service can use the lookup service to find an instance of the service. A match may be made based on the specific Java™ programming language types implemented by the service as well as the specific attributes attached to the service.

If a service encounters a problem that needs administrative attention, like a printer running out of toner, the service can add an attribute that indicates the problem. Administrators (or programs) can then use the event mechanism to receive notification of such problems.

The attributes of a service item are represented as a set of attribute sets. An individual set of attributes may be represented as an instance of a cross in the Java programming language, each attribute being a public field of that class. The class provides strong typing of both the set and the individual attributes. A service item can contain multiple instances of the same class with different attribute values as well as multiple instances of different classes. For example, an item may have multiple instances of a Name class, each giving the common name of the service in a different language, plus an instance of a Location class, an Owner class, and various service-specific classes.

Service Items are stored in the lookup service as instances of the ServiceItem class, as described below:

public class Service Item {public static final long ASSIGN_SERVICE_ID=0;
  public long serviceID;
  public Object service;
  public Entry [] attributeSets;
  }

The "serviceID" element is a numerical identifier of the service. The "service" element is an object representing the service or a stub facilitating access to the service, and the "attributeSets" element contains the array of attributes for the service.

Items in the lookup service are matched using instances of the ServiceTemplate class, which is defined below:

public class Service Template {public static final long ANY_SERVICE_ID=0;
  public long serviceID;
  public Class[] serviceTypes;
  public Entry[] attributeSetTemplates;
  }

The "serviceTypes" element defines the types of the service. An item (item) matches a service template (tmp1) if item.serviceID equals tmp1.serviceID (or if tmp1.serviceID is zero) and item.service is an instance of every type in tmp1.serviceTypes, and item.attributeSets contains at least one matching entry for each entry template in tmp1.attributeSetTemplates. Entry matching uses the following rule: an entry matches an entry template if the class of the entry is the same as, or a superclass of, the class of the template and every non-null field in the template equals the corresponding field of the entry. Every entry can be used to match more than one template. Both serviceTypes and attributeSetTemplates can be null in a service template. The ServiceMatches class is used for the return value when looking up multiple items. The definition of this class follows:

public class ServiceMatches {public ServiceItem[] items;
    public int totalMatches;
    }

The interface to the lookup service is defined by a ServiceRegistrar interface data structure. This interface is not a remote interface. Instead, each implementation of the lookup service exports proxy objects that implement the ServiceRegistrar interface local to the client, using an implementation-specific protocol to communicate with the actual remote server. "Proxy objects" refer to objects that run in the client's address space and that facilitate access to the lookup service. Methods are provided to register service items, find items that match a template, modify attributes of existing items, receive notifications when items are modified, and incrementally explore the collection of items along the three major axes: entry class, attribute value, and service type. The definition of the interface follows:

public interface ServiceRegistrar {long REGISTRAR_SERVICE_ID=1;
    ServiceLease register (Service Item item, long lease expiration) throws RemoteException;
    Object lookup (ServiceTemplate tmp1) throws RemoteException
    ServiceMatches lookup(ServiceTemplate tmp1, int maxMatches) throws RemoteException;
    int addAttributes (ServiceTemplate tmp1, Entry [] attrSets) throws RemoteException;
    int modifyAttributes(ServiceTemplate tmp1, Entry [] attrSets) throws RemoteException;
    int TRANSITION_MATCH_NOMATCH=1;
    int TRANSITION_NOMATCH_MATCH=2;
    int TRANSITION_MATCH_MATCH=3;
    EventRegID notify (Service Template tmp1, int transition, RemoteEventListener listener, MarshalledObject handback, long leaseExpiration) throws RemoteException;
    Class [] getEntryClasses (ServiceTemplate tmp1) throws RemoteException;
    Object [] getFieldValues (ServiceTemplate tmp1), int setIndex, String field) throws NoSuchFieldException, RemoteException;
    Class [] getServiceTypes (Service Template tmp1, String packagePrefix throws RemoteException This interface includes various methods, including the register method, the lookup method (single parameter form), the lookup method (two parameter form), the addAttributes method, the modifyAttributes method, the modify method, the getEntryClass method, the getFieldValues method, and the getServiceTypes method. The "register" method is used to register a new service and to re-register an existing service. This method is defined so that it can be used in an idempotent fashion. Specifically, if a call results in generation of an exception (in which case the item might or might not have been registered), the caller can simply repeat the call with the same parameters.

To register a new service using the register method, item.ServiceID should be zero; if item.ServiceID does not equal any existing item's service object, then a new unique service id will be assigned and returned. The service id is unique over time with respect to this lookup service. If item.ServiceID does equal an existing item's service object, the existing item is deleted from the lookup service (even if it has different attributes), but that item's service id is reused for the newly registered item.

To re-register an existing service using the register method, item.ServiceID should be set to the same unique service id that was returned by the initial registration. If an item is already registered under the same service id, the existing item is deleted (even if it has different attributes, or a different service instance). Note that service object equality is not checked in this case to allow for reasonable evolution of the service (e.g., the serialized form of the stub changes, or the services implements a new interface).

When an item is registered, duplicate attribute sets are eliminated in the stored representation of the item. Additionally, the registration is persistent across restarts of the lookup service.

The single-parameter form of the "lookup" method returns the service object (i.e., ServiceItem.service) from an item matching the template, or null if there is no match. If multiple items match the template, it is arbitrary as to which service object is returned. If the returned object cannot be deserialized, an exception is generated.

The two-parameter form of the "lookup" method returns at most maxMatches items matching the template, plus the total number of items that match the template. The return value is never null, and the returned items array is only null if maxMatches is zero. For each returned item, if the service object cannot be deserialized, the service field of the item is set to null and no exception is generated. Similarly, if an attribute set cannot be deserialized, that element of the attributeSets array is set to null and no exception is generated.

The "addAttributes" method adds the specified attribute sets (those that aren't duplicates of existing attribute sets) to all items matching the template. The number of items that were matched is returned. Note that this operation has no effect on existing attribute sets of the matching items, and the operation can be repeated in an idempotent manner.

The "modifyAttributes" method is used to modify existing attribute sets. The lengths of tmpl.attributeSetTemplates and attrSets must be equal or an exception is generated. For each item that matches the template, the item's attribute sets are modified as follows. For each array index I: if attrSets[i] is null, then every entry that matches tmpl.attributeSetTemplates[i] is deleted, otherwise, for every non-null field in attrSets [I], the value of that field is stored into the corresponding field of every entry that matches tmpl.attributeSettemplates[i]. The class of attrSets [i] must be the same as, or a superclass of, the class of tmpl.attributeSetTemplates [I], or an exception is generated. If the modification results in duplicate entries within an item, the duplicates are eliminated. The number of items that were matched is returned.

The "notify" method is used to register for event notification. The registration is leased, and the lease expiration request is exact. The concept of a lease is described in greater detail in U.S. patent application Ser. No. 09/044,923, entitled "Method and System for Leasing Storage," which has previously been incorporated by reference. The registration is persistent across restarts of the lookup service until the lease expires or is canceled. The event id in the returned EventRegId is unique at least with respect to all other active event registrations at this lookup service with different service templates of transitions.

While the event registration is in effect, a notification containing an indication of the event is sent to the specified listener whenever a register, lease cancellation or expiration, addAttributes, or modifyAttributes operation results in a service item changing state in a way that satisfied the template and transition combination. A list of the transitions follows, although other transitions may also be implemented within the scope of the present invention:

TRANSITION_MATCH_NOMATCH: an event is sent when the changed item matches the template before the operation, but doesn't match the template after the operation (this includes deletion of the item).

TRANSITION_NOMATCH_MATCH: an event is sent when the changed item doesn't match the template before the operation, (this includes not existing), but does match the template after the operation.

TRANSITION_MATCH_MATCH: an event is sent when the changed item matches the template both before and after the operation.

The "getEntryClasses" method looks at all items that match the specified template, finds every entry among those items that either doesn't match any entry templates or is a subclass of at least one match entry template, and returns the set of the (most specific) classes of those entries. Duplicate classes are eliminated, and the order of classes within the returned array is arbitrary. Null (not a empty array) is returned if there are no such entries or no matching items. If a returned class cannot be deserialized, that element of the returned array is set to null and no exception is thrown.

The "getFieldValue" method identifies all items that match the specified template. This method returns the values of the items that match the specified template.

The "getServiceTypes" method looks at all items that match the specified template, and for every service object, this method finds every type (class or interface) of which the service object is an instance that is neither equal to, nor a superclass of, any of the service types in the template, and returns the set of all such types that start with the specified package prefix. Duplicate types are eliminated, and the order of types within the returned array is arbitrary. Null (not an empty array) is returned if there are no such types. If a returned type cannot be deserialized, that element of the returned array is set to null and no exception is thrown.

The Lookup Service Processing

Figure 3A:
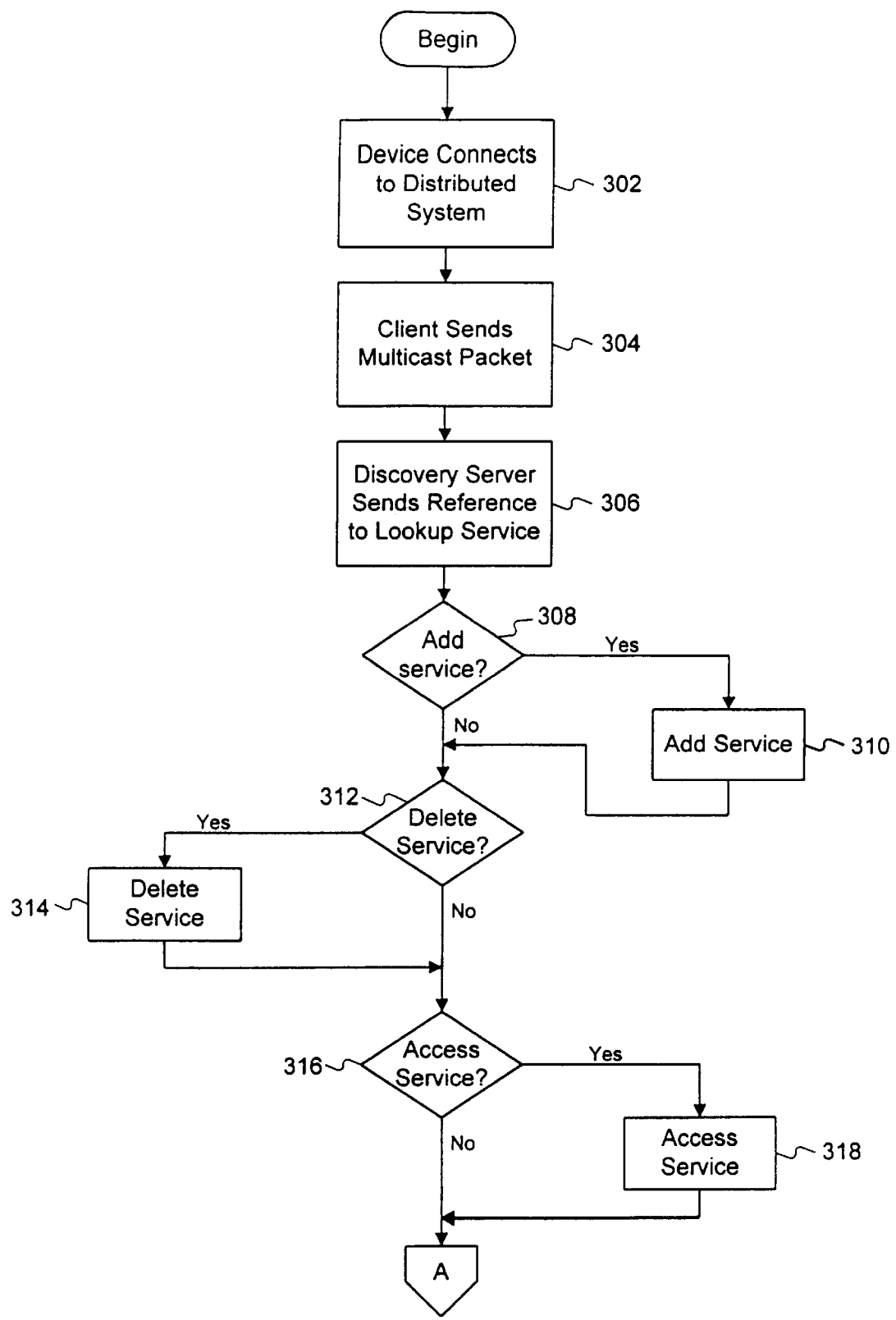
FIGS. 3A and 3B depict a flow chart of the steps performed when a client utilizes the lookup service depicted in FIG. 1.
Figure 3B:
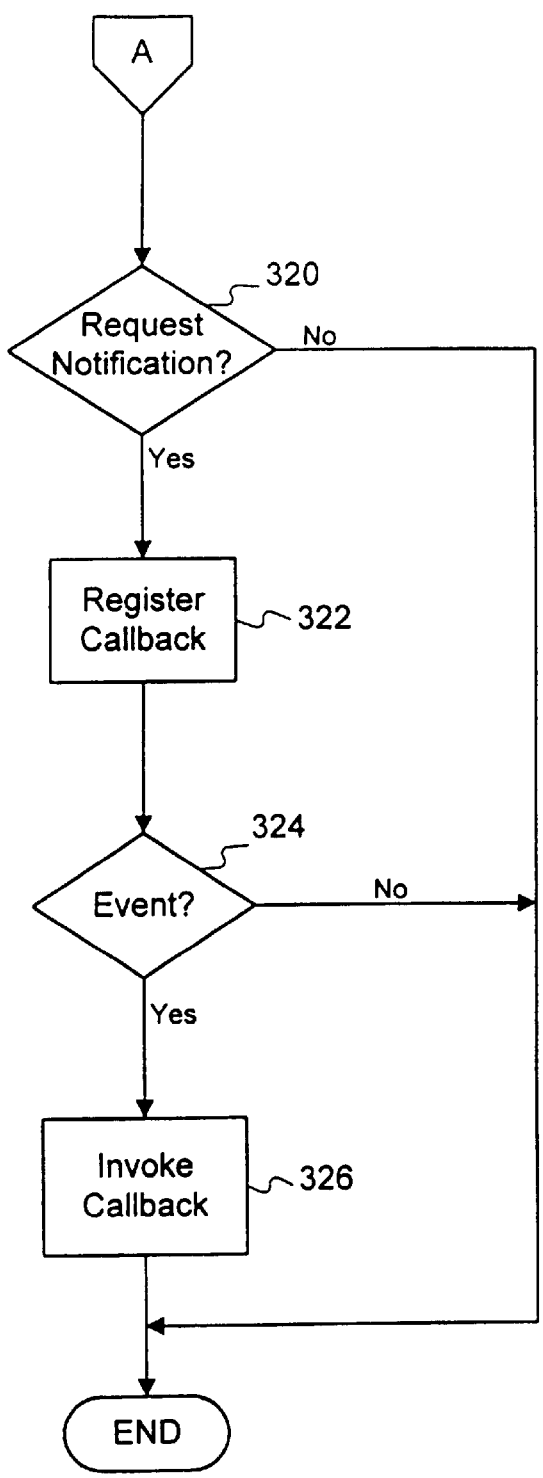

FIGS. 3A and 3B depict a flowchart of the steps performed when a client, a program running on a particular device, makes use of the lookup service 212. Initially, the device on which the client runs is connected to the Jini distributed system (step 302). Next, the client sends a multi-cast packet containing code for communication with the client (step 304). In this step, the client is performing the discovery protocol as described in further detail in co-pending U.S. patent application Ser. No. 09/044,939, entitled "Apparatus and Method for Providing Downloadable Code for Use in Communication With a Device in a Distributed System," which has previously been incorporated by reference.

After the client sends the multi-cast packet, the discovery server 214 receives the packet and uses the code contained in the packet to send a reference to the lookup service to the client (step 306). After the client receives the reference to the lookup service, the client is able to utilize the interface of the lookup service to either add a service, delete a service, access a service, or request notification when the lookup service is updated, as reflected by steps 308–326.

At some point during the processing of the client, it may decide to add a service to the lookup service (step 308). If it decides to add a service, the client adds a service to the lookup service by invoking the register method, which sends to the lookup service either an object representing the service or a stub containing code and data to facilitate access to the service (step 310). The addition of the stub to the lookup service is described in greater detail in co-pending U.S. patent application Ser. No. 09/044,826, "entitled Method and System for Facilitating Access to a Lookup Service," which has previously been incorporated by reference.

Next, the client may decide to delete one of its services from the lookup service (step 312). If a client decides to do so, the client deletes the service from the lookup service by invoking the register method on the interface of the lookup service to delete the entry for the particular service and delete the stub code associated with it (step 314). It should be noted that both the addition of a service and the deletion of a service are done dynamically and in a manner that does not prohibit other clients from using the lookup service while the update occurs.

At some point later in the processing of the client, the client may decide to access a service provided by the lookup service (step 316). If a client decides to access a service provided by the lookup service, the client accesses the service by invoking the lookup method, which retrieves from the lookup service either the object or the stub information for the service, and the client then either invokes methods on the object to use the service or uses the stub information to access the service (step 318). The step is described in greater detail in co-pending U.S. patent application Ser. No. 09/044,826, entitled "Method and System for Facilitating Access to a Lookup Service," which has previously been incorporated by reference.

The client may also request to be notified when an update occurs to the lookup service (step 320 in FIG. 3B). If a client wishes to be notified, the client invokes the notify method on the lookup service interface to register a callback routine with the lookup service (step 322). A "callback routine" is a function that is invoked when the lookup service is updated. Additionally, the notify method allows the client to register an object that will be passed back, via RMI, as a parameter to the callback function.

Next, if an event has occurred for which the client wants to be notified (step 324), the registered callback routine is invoked by the lookup service (step 326). In this step, the client is notified of the occurrence of the event and can take appropriate action. For example, if a service that the client was currently using has become unavailable, the client may store information so that it no longer uses it.

Figure 4:
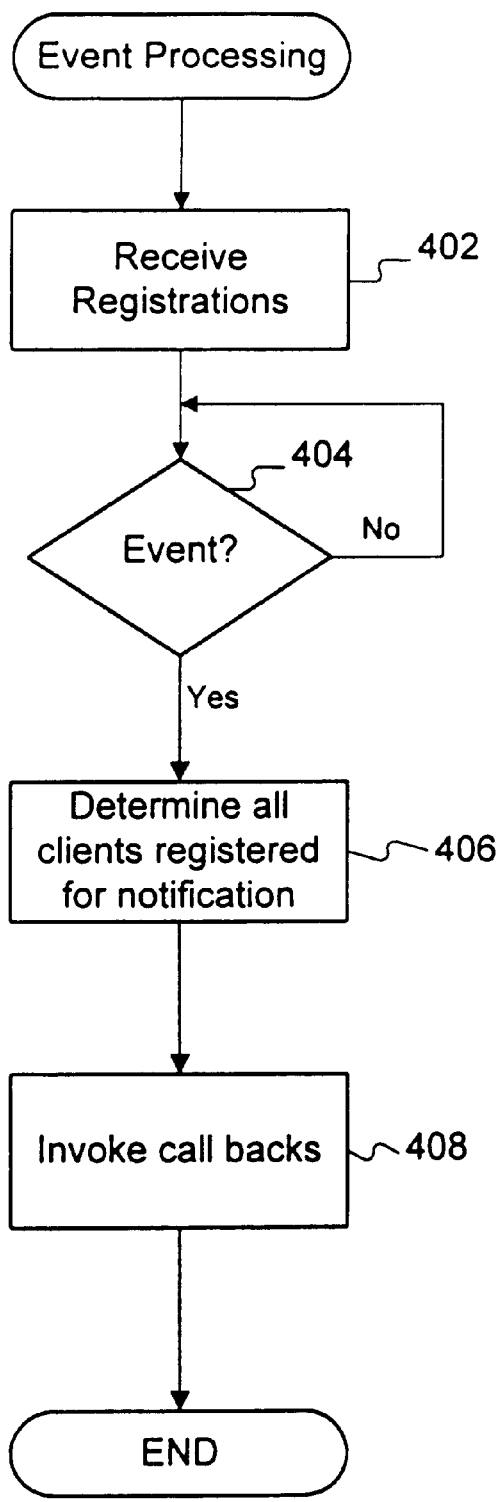
FIG. 4 depicts a flow chart of the steps performed by the lookup service of FIG. 1 when performing event-related processing.

FIG. 4 depicts a flow chart of the steps performed by the lookup service when performing event-related processing. Initially, the lookup service receives registrations from a number of clients interested in receiving notifications when particular events occur (step 402). In this step, the lookup service receives the registrations via invocation of the notification method on the lookup service interface and stores into a table, known as the event table, all of the associated information, such as an indication of the client to be notified, a reference to the callback routine, an object to be passed as a parameter to the callback routine, and an indication of the event in which the client is interested. It should be noted that a client may register to be notified upon the occurrence of an event, or the client may register for a third party to be notified. After receiving the registrations, the lookup service determines whether an event occurred such that at least one client has registered an interest in the event (step 404). The lookup service makes this determination by identifying when, for example, a new service has been added to the lookup service, an existing service has been deleted from the lookup service, or the attributes of a service have been modified. If such an event has not occurred, the event notification process of the lookup service remains in a wait state.

However, if an event has occurred, the lookup service determines all clients registered for notification for this event (step 406). The lookup service makes this determination by accessing the event table. Next, the lookup service invokes the callback routines registered for each client identified in step 406 (step 408). In this step, the event table contains a reference to the callback routine registered by each client, and the lookup service invokes each callback routine, passing the registered objects as parameters, to notify the clients of the occurrence of the event.

The Conference Room Example

Figure 5:
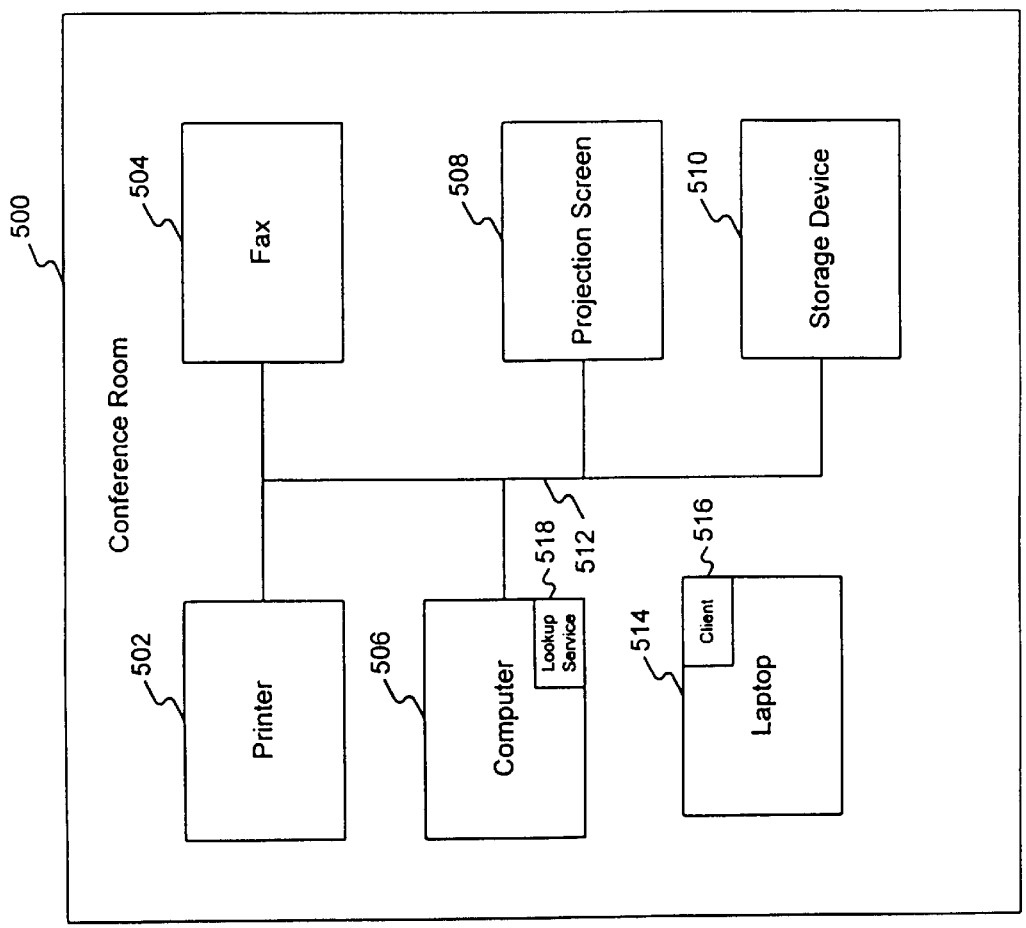
FIG. 5 depicts a conference room containing a number of devices consistent with the present invention.

Described below is an example use of the lookup service 212 with respect to a conference room 500 as depicted in FIG. 5. The conference room 500 contains a printer 502, a fax machine 504, a computer 506, a projection screen 508, and a storage device 510, all interconnected by a network 512. The computer 506 contains a lookup service 518 that defines all services made available by the conference room Djinn. In this example, the user enters the conference room 500 with laptop 514. Such a situation occurs when a user with a laptop enters the conference room 500 for a meeting. If the user wishes to make use of the services provided by various devices in the conference room 500, the user must join the Djinn of the conference room. In order to do so, the user connects the laptop to the network 512 and runs a program, client 516, to perform the boot and join (or discovery) process, as described above. After the completion of the boot and join process, the client 516 (e.g., a browser) receives a reference to the lookup service 518 defining the services provided by the conference room Djinn. Using this reference, the client 516 downloads an applet from the lookup service 518 that displays a screen 600, as shown in FIG. 6.

Figure 6:
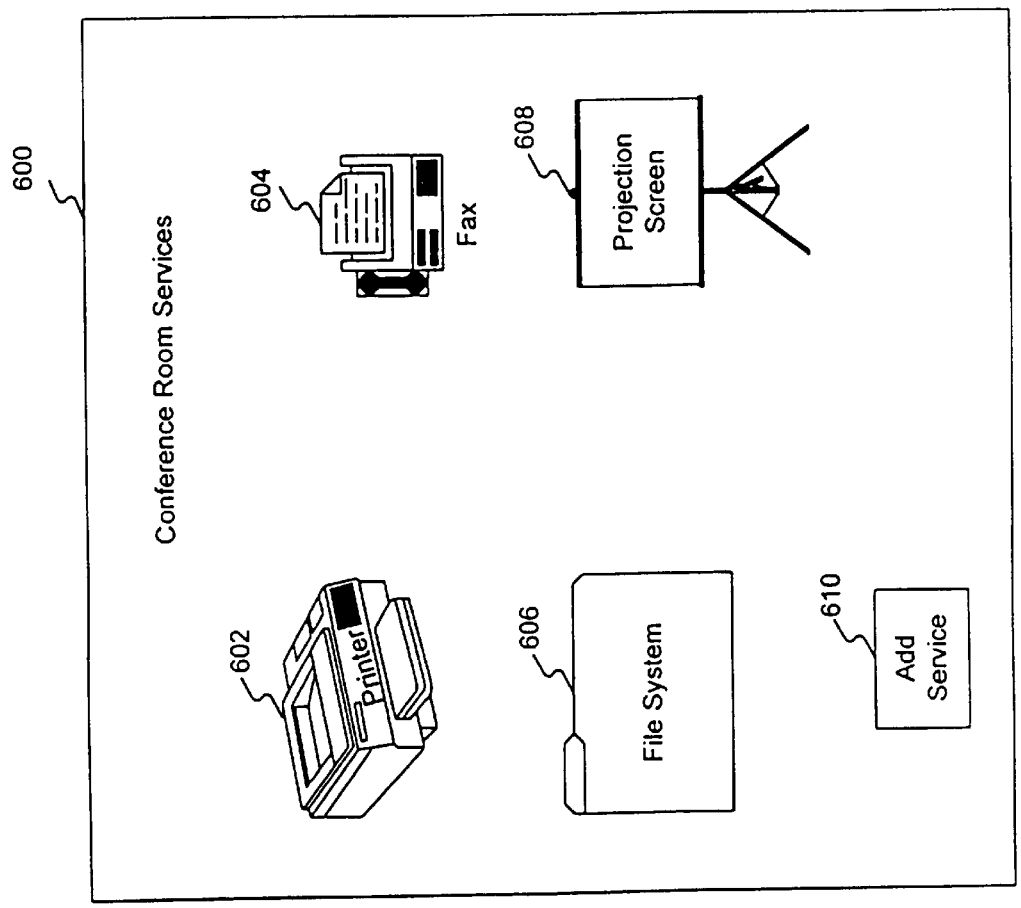
FIG. 6 depicts a screen displaying icons representing services available in the conference room of FIG. 5.

FIG. 6 depicts screen 600 displaying the available services of the lookup service 518 represented as various icons, including a printer 602, a fax 604, a file system 606, and a projection screen 608. The screen 600 also displays an add service button 610. When the printer icon 602 is selected, the stub code (i.e., service item) for the printer is downloaded to the client so that the client may make use of the printer. Similarly, selection of the fax icon 604, the file system icon 606, or the projection screen icon 608 downloads the appropriate stub information so that the client can use those services. The file system icon 606 represents the file system of the computer 506.

Figure 7:
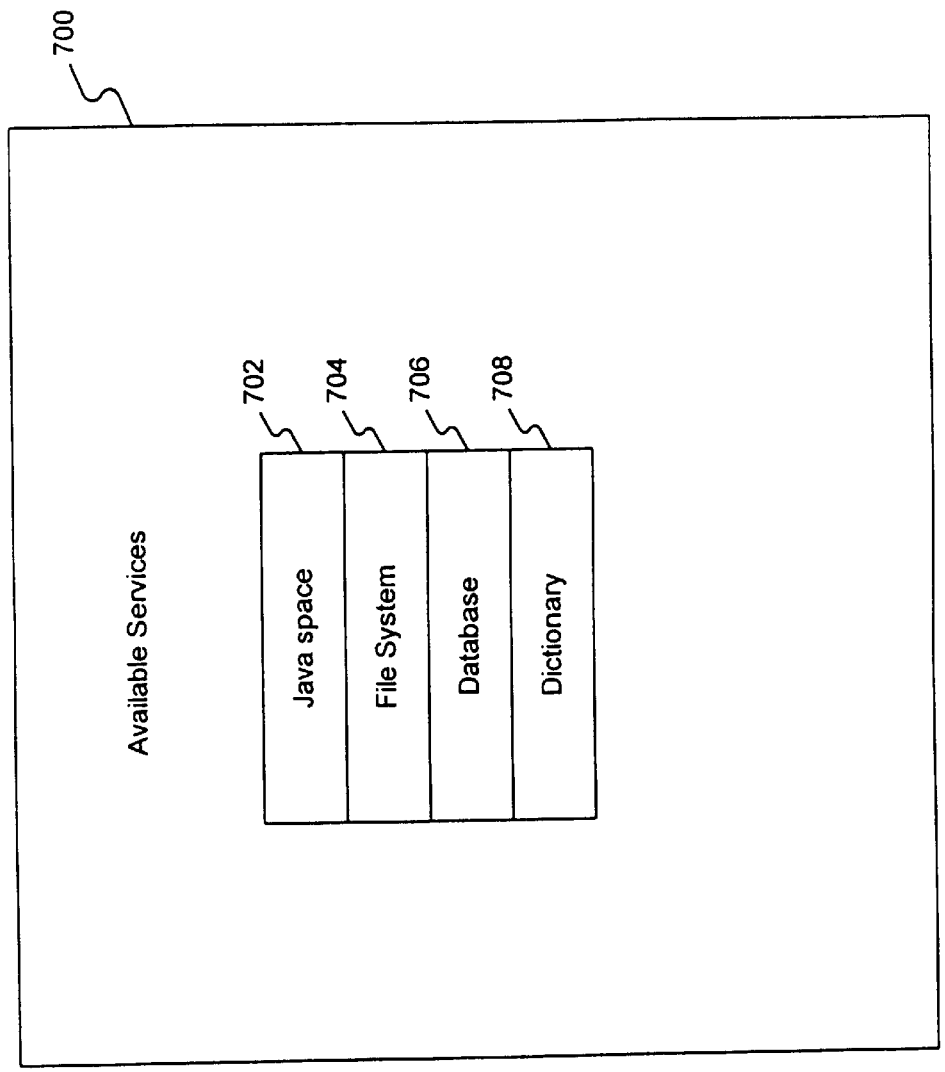
FIG. 7 depicts a screen displaying the available services provided by a computer in the conference room of FIG. 5.

The user, however, may want to add a service and thus selects the add service button 610. Upon selection of the add service button 610, a screen 700 is presented to the user as shown in FIG. 7. The screen 700 depicts the available services of the laptop 514 which the user may add to the Djinn. For example, the available services on the laptop 514 may include a Java space 702, the laptop file system 704, a database 706, and a dictionary 708. The user may select any of these services, which are then automatically added to the lookup service and made available to other users of the Djinn.

Although methods and systems consistent with the present invention have been described with reference to a preferred embodiment thereof, those skilled in the art will know of various changes in form and detail which may be made without departing from the spirit and scope of the present invention has defined in the appended claims.

What is claimed is:

1. A method in a distributed system having a lookup service with associated network services available in the distributed system and having a client accessing the network services, the method comprising the steps of:

adding a device to the distributed system, the device containing a new client having a new service;

broadcasting an object by the new client, the object containing code for communicating with the new client;

receiving the object by a discovery server, and using the code to send to the new client a reference to the lookup service by the discovery server;

receiving the reference by the new client; and adding an indication of the new service to the lookup service by the new client such that the network services associated with the lookup service remain accessible during the adding of the new service.

2. The method of claim 1, wherein the adding step includes the step of:

adding to the lookup service a stub containing code and data for facilitating access to the new service.

3. The method of claim 1, wherein the adding step includes the step of:

adding a service object to the lookup service, the service object having a function for performing the new service.

4. The method of claim 1, further including the step of:

deleting the indication of the new service from the lookup service.

5. The method of claim 1 further including the steps of:

registering the new client with the lookup service to receive a notification when the lookup service is updated;

determining by the lookup service when it has been updated; and sending a notification to the new client when the lookup service determines that it has been updated.

6. The method of claim 5 wherein the registering step includes the step of:

registering a callback routine with the lookup service, and wherein the sending step includes the step of:

invoking the registered callback routine.

7. The method of claim 6 wherein the registering step includes the step of:

registering a parameter object with the lookup service, and wherein the invoking step includes the step of:

invoking the registered callback routine passing the parameter object as a parameter to the callback routine.

* * * * *